United States Patent
Feng (10) Patent No.: US 11,563,713 B2
(45) Date of Patent: Jan. 24, 2023

(54) DOMAIN NAME SERVER ALLOCATION METHOD AND APPARATUS

(71) Applicant: HUAWEI TECHNOLOGIES CO., LTD., Guangdong (CN)

(72) Inventor: Jiangping Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/358,308

(22) Filed: Jun. 25, 2021

(65) Prior Publication Data

US 2021/0320896 A1 Oct. 14, 2021

Related U.S. Application Data

(63) Continuation of application No. PCT/CN2019/129581, filed on Dec. 28, 2019.

(30) Foreign Application Priority Data

Dec. 28, 2018 (CN) .......................... 201811624514.9

(51) Int. Cl.
*H04L 61/4511* (2022.01)
*H04L 61/255* (2022.01)
*H04L 61/5007* (2022.01)
*H04L 101/69* (2022.01)

(52) U.S. Cl.
CPC ........ *H04L 61/4511* (2022.05); *H04L 61/255* (2013.01); *H04L 61/5007* (2022.05); *H04L 2101/69* (2022.05)

(58) Field of Classification Search
CPC ............. H04L 61/1511; H04L 61/2007; H04L 61/255; H04L 61/609

USPC ......................................................... 709/223
See application file for complete search history.

(56) References Cited

U.S. PATENT DOCUMENTS 7,840,699 B2 * 11/2010 Fujita .................. H04L 61/1511
709/238
8,326,980 B2 * 12/2012 Huang .............. H04L 29/12066
709/224
9,237,027 B2 * 1/2016 Ellard ................. H04L 63/0236
9,277,399 B2 * 3/2016 Cherian .................. H04W 8/26
9,525,602 B2 * 12/2016 Martini ............... H04L 61/2076
(Continued)

FOREIGN PATENT DOCUMENTS

| CN | 103974237 A | 8/2014 |
|---|---|---|
| WO | 2018171859 A1 | 9/2018 |
| WO | 2018199649 A1 | 11/2018 |

OTHER PUBLICATIONS

ETSI GS MEC 003 V1.1.1 (Mar. 2016),Mobile Edge Computing (MEC);Framework and Reference Architecture,Total 18 Pages.
(Continued)

*Primary Examiner* — David P Zarka (57) ABSTRACT

In a domain name system (DNS) server allocation method, a session management function (SMF) receives a session establishment request message sent by UE, where the request message includes a name of a data network to be accessed by the UE. The SMF obtains an IP address of a first DNS server based on the name of the data network and a geographical location of the UE. The SMF then sends to the UE a session establishment response message that includes the IP address of the first DNS server.

12 Claims, 7 Drawing Sheets

(56) References Cited

U.S. PATENT DOCUMENTS

| | | | |
|---|---|---|---|
| 9,602,468 B2* | 3/2017 | Tubi | H04L 61/1511 |
| 9,769,665 B2* | 9/2017 | Lee | H04L 63/0807 |
| 10,708,220 B2* | 7/2020 | Vig | H04M 15/8033 |
| 10,785,155 B2* | 9/2020 | Damola | H04M 15/80 |
| 2011/0295940 A1 | 12/2011 | Saleem et al. | |
| 2022/0078606 A1* | 3/2022 | Maeder | H04L 61/5007 |

OTHER PUBLICATIONS

3GPP TS 23.502 V15.4.0 (Dec. 2018), 3rd Generation Partnership Project; Technical Specification Group Services and System Aspects; Procedures for the 5G System;Stage 2(Release 15), 346 pages.

Jayshree Bharatia et al.,"Mobile IPv6 Extension: Using DNS Servers Assigned by Home Agent",draft-bharatia-mobileip-v6-dns-ext-00.txt>,Mobile IP Working Group,Mar. 2002,total 4 pages.

Motorola,"Update of PDP Context and P-CSCF Discovery test cases to Rel-6",3GPP TSG-RAN5 Meeting #33 R5-063572,Riga, Latvia, Nov. 6 to 10, 2006,total 54 pages.

* cited by examiner

DOMAIN NAME SERVER ALLOCATION METHOD AND APPARATUS

CROSS-REFERENCE TO RELATED APPLICATIONS

This application is a continuation of International Application No. PCT/CN2019/129581, filed on Dec. 28, 2019, which claims priority to Chinese Patent Application No. 201811624514.9, filed on Dec. 28, 2018. The disclosures of the aforementioned applications are hereby incorporated by reference in their entirety.

TECHNICAL FIELD

The present invention relates to the communications field, and in particular, to a domain name server allocation method and apparatus.

BACKGROUND

Multi-access edge computing provides users with a cloud-computing-based capability at the edge, close to mobile users, of an operator's network. Users can deploy applications at the edge of the network by using this capability. Multi-access edge computing can also provide real-time network information (such as user location and base station load). With this information, users can develop differentiated applications. After the cloud computing capability is deployed at the network edge, a carrier-class service environment with high performance, a low latency, and large bandwidth can be built, to accelerate distribution and downloading of content, services, and applications in a network, so that a consumer enjoys network experience with higher quality.

An ultra-low latency service is extremely sensitive to a latency, but both a transmission path and a forwarding node increase the latency. Mobile edge computing enables content and services to be deployed close to users. The transmission path is short and a quantity of forwarding nodes is small. Therefore, mobile edge computing is a prerequisite for an ultra-low latency service. Typical scenarios include internet of vehicles, industrial control, telemedicine, virtual reality/augmented reality, and the like.

Figure 1:
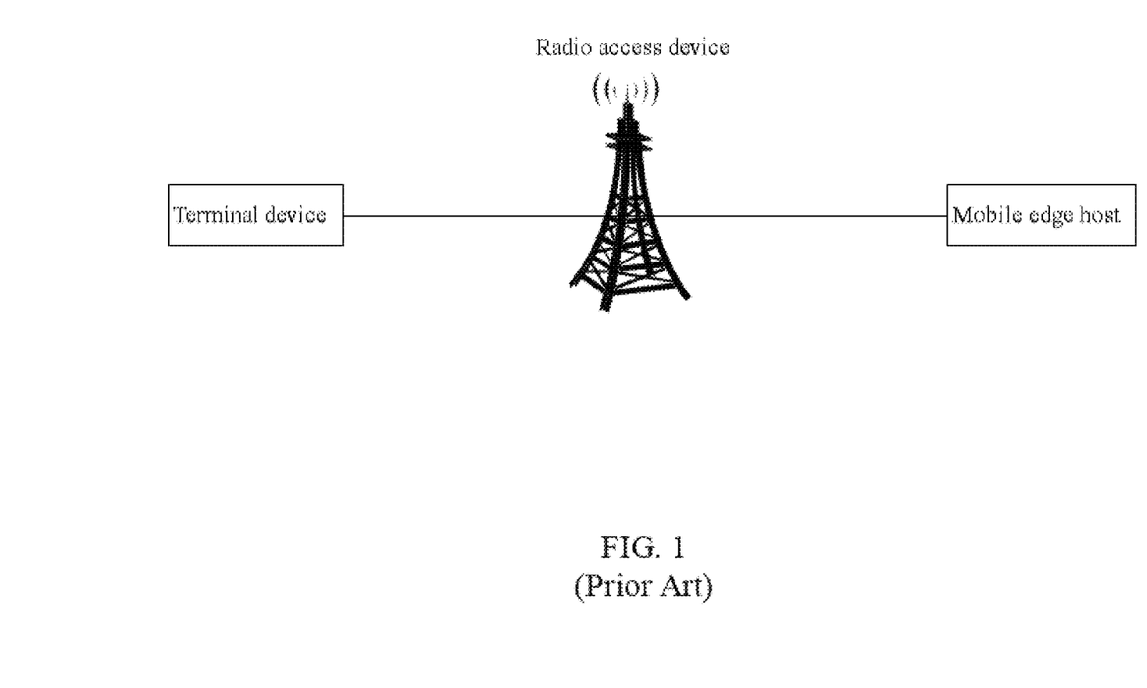
FIG. 1 is a schematic diagram of a nearby deployed mobile edge host in the conventional technology.

For an ultra-large bandwidth service, traffic of ultra-large bandwidth is processed nearby by deploying mobile edge computing (such as a mobile edge host shown in FIG. 1) nearby, so that impact exerted by large bandwidth on a backbone network can be greatly reduced. Typical scenarios include, for example, live broadcast of a match in a stadium, live broadcast of a concert, and mobile content distribution.

Figure 2:
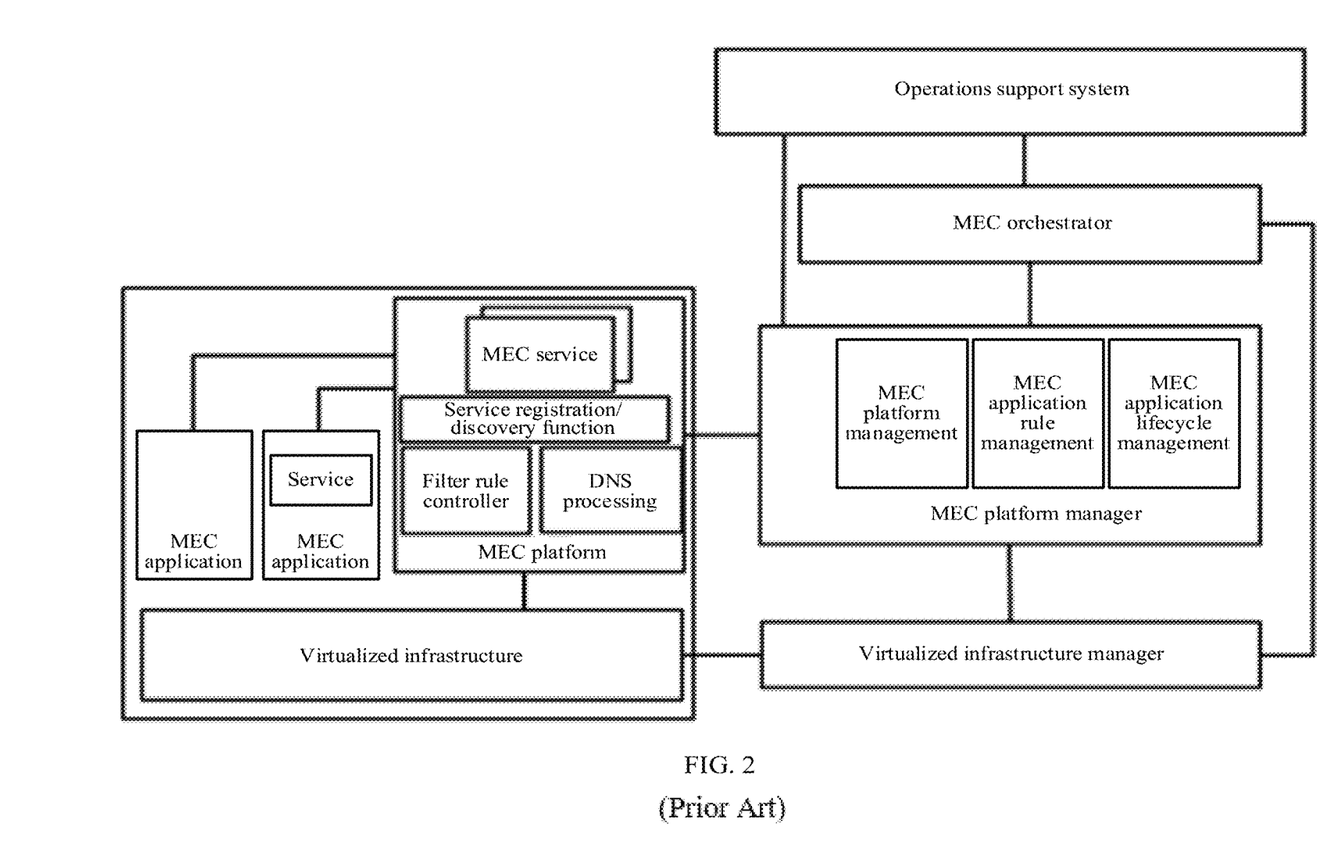
FIG. 2 is a diagram of a reference architecture of mobile edge computing in the conventional technology.

The European Telecommunications Standards Organization (ETSI) defines a reference architecture for multi-access edge computing in the specification ETSI GS MEC 003. As shown in FIG. 2, the architecture mainly includes two parts: a multi-access edge computing host (Multi-access Edge Computing Host, MEC host) and a multi-access edge computing management system. The MEC host includes an MEC platform, virtualized infrastructure, and an MEC application. The virtualized infrastructure provides virtualized computing, storage, and network resources for a mobile edge application. The MEC application is deployed on the MEC host in a form of a virtual machine or a container. The MEC platform mainly includes a service registration function, a service discovery function, and some common services, such as a DNS server or a DNS proxy service. The multi-access edge computing management system includes an MEC orchestrator, an MEC platform manager, and a virtualized infrastructure manager. The MEC orchestrator maintains an overall view of all mobile edge hosts, available resources, and available MEC services in the MEC system, and triggers application instantiation and termination. The MEC platform manager is configured to manage the MEC platform, a lifecycle of a mobile MEC application, and a flow rule and a DNS rule of the application. The virtualized infrastructure manager manages a virtualized resource required for the MEC application.

The 3GPP defines a 5G standard. The TS23.502 standard defines a process in which an application function (Application Function, AF) affects a session management function (Session Management Function, SMF) to select a route. The AF sends information such as a deployment location, an offloading rule, and a routing rule of the application to a network exposure function (Network Exposure Function, NEF). The information is finally sent to the SMF through network functions such as a unified data repository (Unified Data Repository, UDR) and a policy control function (Policy Control Function, PCF). The SMF uses the information to select a data network access identifier (DN Access Identifier, DNAI) and a user plane function (User Plane Function, UPF), and set an offloading rule, a routing rule, and the like. Components in the ETSI MEC architecture, such as an MEC orchestrator, an MEC platform manager, an MEC platform, or an MEC application, all can interact with a 3GPP network as an AF. The DNAI is an identifier used by the UPF to access a local data network on which the MEC application is deployed, and a deployment location of the MEC application may be represented by using the DNAI.

UEAn MEC application service on an MEC host accessed by a user terminal or equipment (UE) is represented by using a domain name. A data network needs to allocate a DNS server to the UE, and the DNS server needs to perform IP address translation on a domain name of the MEC application service and return an IP address to the UE. However, in the conventional technology, the UE cannot obtain an IP address of a DNS server in a local data network, and consequently, the UE cannot resolve a domain name of an application service in the local data network.

SUMMARY

To resolve a technical problem in the conventional technology, embodiments of the present invention provide a domain name system DNS server allocation method, apparatus and system.

An embodiment of the present invention provides a domain name system DNS server allocation method, including:

a session management function SMF receives a session establishment request message sent by a UE, where the request message includes a name of a data network to be accessed by the UE;

the SMF obtains an IP address of a first DNS server based on the name of the data network and a geographical location of the UE; and the SMF sends a session establishment response message to the UE, where the response message includes the IP address of the first DNS server.

That the SMF obtains the IP address of the first DNS server based on the name of the data network and the geographical location of the UE specifically includes:

the SMF determines a first user plane function UPF, and determines a first DNAI based on the first UPF and the data network; and the SMF queries a list of mapping relationships between IP addresses of DNS servers and DNAIs based on the first DNAI, to obtain the IP address of the first DNS server.

The list of mapping relationships between IP addresses of DNS servers and DNAIs is created and sent to a PCF by an application function, and then is obtained by the SMF from the PCF, where the application function is an MEC platform, an MEC platform manager, or an MEC orchestrator in a multi-access edge computing MEC system.

The method further includes:

the first UPF receives a DNS request message sent by the UE, where the request message includes a domain name of an application service that the UE requests to access, and a destination address of the request message is the IP address of the first DNS server;

the first UPF routes the request message to the first DNS server based on the destination address;

the first UPF receives a response message sent by the first DNS server, where the response message includes an IP address of the domain name of the requested application service; and the first UPF sends the response message to the UE.

An embodiment of the present invention further provides a domain name system DNS server allocation apparatus, where the apparatus includes:

a receiving unit, configured to receive a session establishment request message sent by a UE, where the request message includes a name of a data network to be accessed by the UE;

an obtaining unit, configured to obtain an IP address of a DNS server based on the name of the data network and a geographical location of the UE; and a sending unit, configured to send a session establishment response message to the UE, where the response message includes the IP address of the DNS server.

An embodiment of the present invention further provides a domain name system DNS server allocation system, where the system includes:

a session management function SMF, configured to receive a session establishment request message sent by a UE, where the request message includes a name of a data network to be accessed by the UE; obtain an IP address of a DNS server based on the name of the data network and a geographical location of the UE; and send a session establishment response message to the UE, where the response message includes the IP address of the DNS server; and a user plane function UPF, configured to receive a DNS request message sent by the UE, where the request message includes a domain name of an application service that the UE requests to access, a destination address of the request message is the IP address of the DNS server; route the request message to the DNS server based on the destination address; receive a response message sent by the DNS server, where the response message includes an IP address of the domain name of the requested application service; and send the response message to the UE.

An embodiment of the present invention further provides a DNS server allocation hardware apparatus, where the apparatus includes a processor and a memory. The memory is configured to store a program for performing the steps in the foregoing method, and store data used to implement the steps in the foregoing method. The processor is configured to execute the program stored in the memory.

An embodiment of the present invention provides a computer-readable storage medium. The computer-readable storage medium stores executable program instructions. When the executable program instructions are run, the executable program instructions are used to perform the steps in the foregoing method.

In the foregoing solutions, according to the foregoing embodiments, the core network element SMF may allocate, based on a location of a local data network to be accessed by the UE, a corresponding DNS server located in the local data network to the UE, where the DNS server is capable of translating a domain name of an application service that the UE needs to access in the local data network. When the UE moves to a new location and needs to access another instance (an instance replica) of the same application service, the SMF allocates a new DNS server to the UE, and the new DNS server can translate the instance. The solutions in the foregoing embodiments simplify a process of implementing a similar function by a related network element such as a core network UPF in the conventional technology, thereby improving processing efficiency of the related network element such as the UPF.

DESCRIPTION OF EMBODIMENTS

To make the objectives, technical solutions, and advantages of this application clearer, the following further describes implementations of this application in detail with reference to the accompanying drawings.

The present invention provides a plurality of embodiments, and these embodiments are mainly used in a 3GPP core network, especially in an MEC scenario. In solutions described in these embodiments, the 3GPP core network may dynamically allocate, based on a location of a local data network to be accessed by UE, a DNS server located in the local data network to the UE. In the embodiments of the present invention, the local data network is a network independent of the 3GPP network, such as the internet. The local data network includes an MEC server, a DSN server, an MEC application service, and the like. These embodiments are described in detail below.

Figure 3:
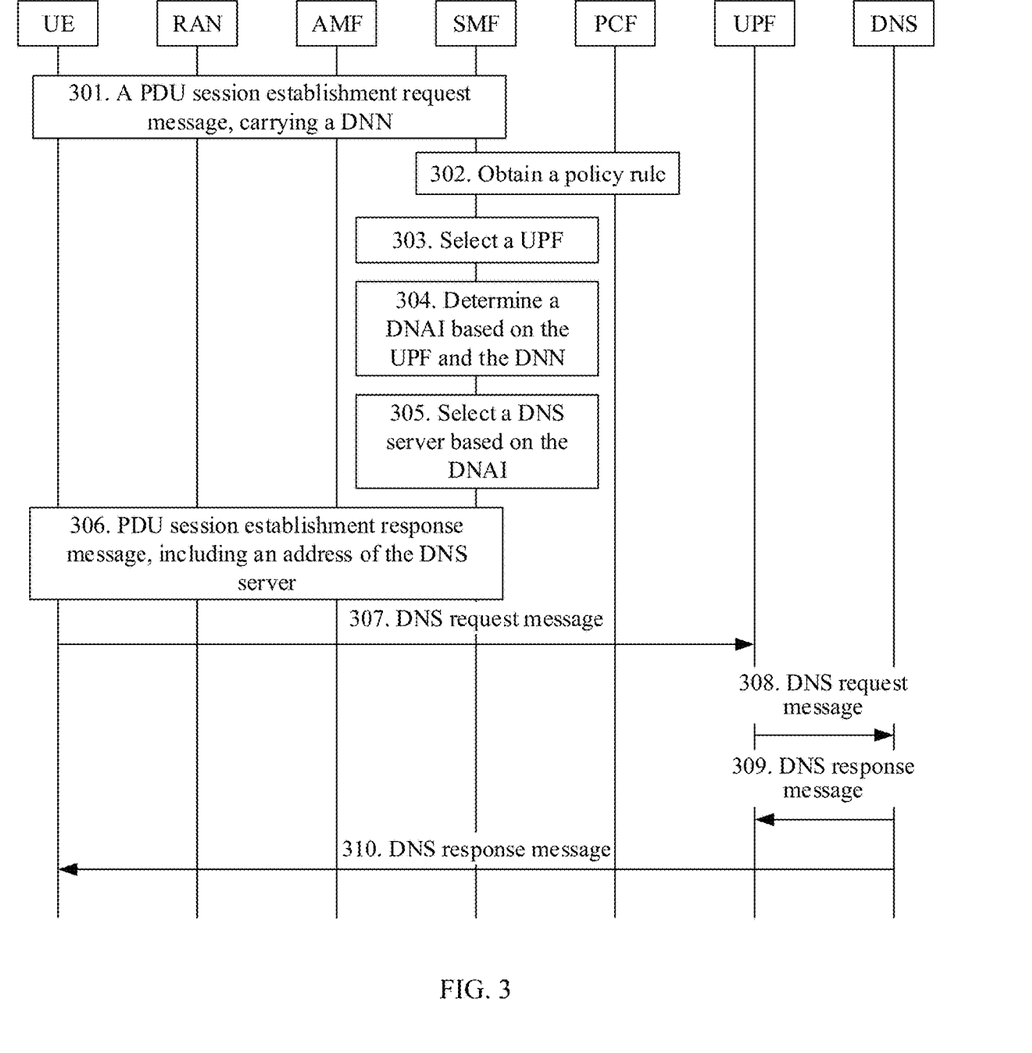
FIG. 3 is a flowchart of allocating a DNS server by a core network to UE in an MEC scenario according to an embodiment of the present invention.

FIG. 3 is a flowchart of allocating a DNS server by a core network to UE in an MEC scenario according to an embodiment of the present invention. The flowchart mainly includes the following steps.

301. The UE sends a PDU session establishment request message, where the PDU session establishment request message carries a data network name DNN of a to-be-accessed data network.

In the MEC scenario, all application services to be accessed by the UE are located in the local data network. Therefore, the session establishment request message carries a data network name DNN of the local data network, and a session connection is established with the local data network.

302. An SMF obtains a policy rule from a PCF, where the policy rule includes a list of mapping relationships between IP addresses of DNS servers and data network access identifiers DNAIs.

After receiving the PDU session establishment request message sent by the UE, the SMF obtains the policy rule from the PCF; or the SMF subscribes to a change of the policy rule from the PCF, and when the policy rule changes, the PCF notifies the SMF of a changed policy rule. The policy rule stored on the PCF is created and is sent by an MEC platform, an MEC platform manager, or an MEC orchestrator in a multi-access edge computing MEC system, where the MEC platform, the MEC platform manager, or the MEC orchestrator serves as an application function (AF). Specific steps are as follows:

(a) An MEC component serving as the AF sends a request message to a NEF.

(b) The NEF stores the request information of the AF in a UDR.

(c) The NEF sends a response message to the AF.

(d) The PCF that subscribes to a modification requested by the AF receives a notification message from the UDR, where the message includes the information described in step (a).

The list includes different data networks and DNS servers that provide domain name translation for application services in the data networks. One data network may have a plurality of DNS servers at different locations.

303. The SMF selects a proper UPF.

Figure 4:
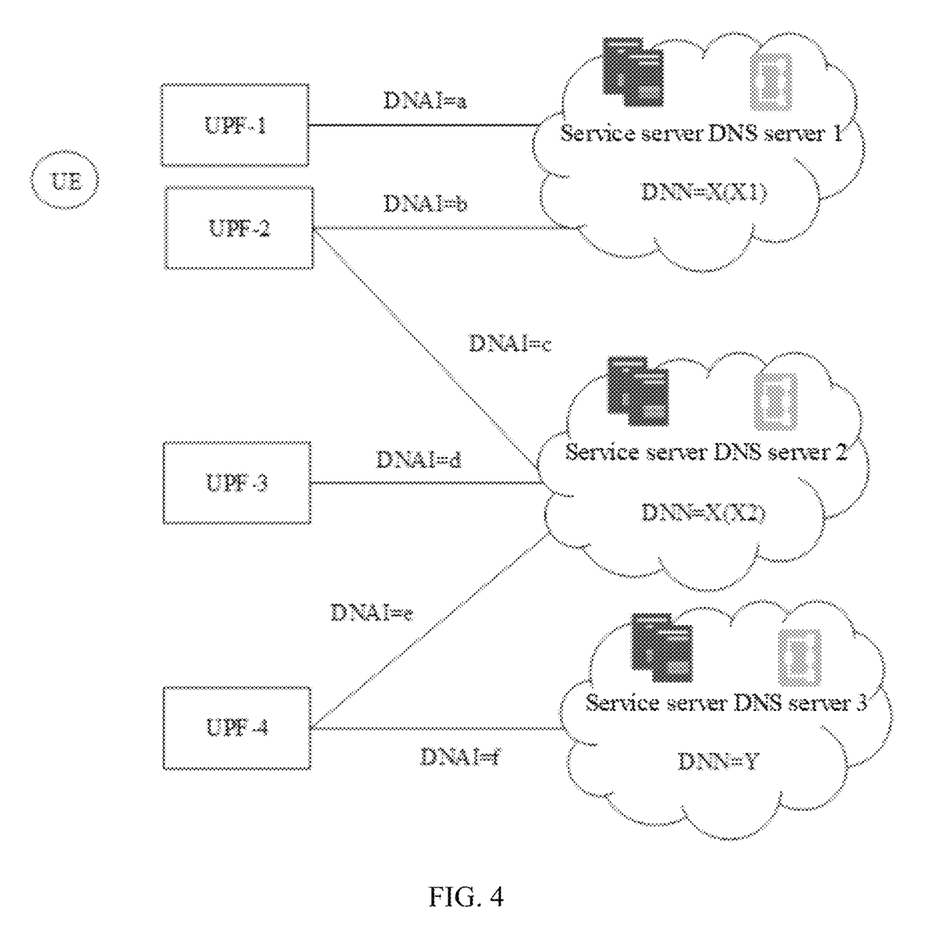
FIG. 4 is a schematic diagram of communication connections between different data networks and different UPFs according to an embodiment of the present invention.

The SMF determines the UPF based on the data network to be accessed by the UE, a geographical location of the UE, and/or a load status of the UPF, specifically, as shown in FIG. 4.

In FIG. 4, there are two local data networks (Data Network, DN). Data network names (Data Network Name, DNN) are X and Y. The network X is deployed at a plurality of different geographical locations, for example, referred to as X1 and X2. If the DN to be accessed by the UE is X, the SMF selects a network X1 closer to the UE based on the geographical location of the UE, and then selects a UPF 1 connected to the X1. Optionally, if there are a plurality of UPFs (for example, including a UPF 2) communicatively connected to the X1, and load of the UPF 2 is far less than that of the UPF 1, the SMF selects the UPF 2. The SMF may flexibly perform a specific selection based on the foregoing parameters.

304. The SMF determines a DNAI based on the selected UPF and a local DNN to be accessed by the UE.

In FIG. 4, a UPF-1 may access the data network X through a link with DNAI=a, and a UPF-2 may access the data network X through a link with DNAI=b. Only the UPF-2 can access the data network Y through a link with DNAI=c. A DNS server and a service server are separately deployed in the two data networks, where the service server runs an application service that the UE needs to access. A DNAI may be used to identify deployment locations of the DNS server and the service server.

A DNAI between the UPF and the data network may be determined based on the UPF determined in step 303.

305. The SMF queries a list of mapping relationship between DNS server addresses and locations based on the DNAI, to obtain an IP address of a DNS server in the local data network.

306. The SMF sends a PDU session establishment acceptance response message to the UE, where the response message includes the IP address of the DNS server.

The SMF sends the PDU session establishment acceptance response message to the UE. It indicates that a PDU session between the UE and the local data network to be accessed by the UE has been established, and the UE has obtained the IP address of the DNS server in the local data network.

307. The UE sends a DNS request message, where the request message includes a domain name of an application service of the local data network to be accessed by the UE (the domain name needs to be resolved by the DNS server to a corresponding IP address.), and a destination address of the request message is the IP address of the DNS server.

308. The UPF routes the DNS request message for accessing the local DNS server to the DNS server in the local data network.

After receiving the DNS request message sent by the UE in step 307, the UPF determined in step 303 routes the DNS request message to a destination DNS server based on the IP address of the DNS server carried in the request message, where the destination DNS server is located in the local data network to be accessed by the UE.

309. The DNS server in the local data network processes the DNS request message, and sends a DNS response message to the UPF, where the response message includes an IP address of the domain name of the application service requested by the UE.

Specifically, the DNS server translates or converts the domain name of the application service in the DNS request message into a corresponding IP address, so that the UE accesses a specific application service in the local data network by using the IP address.

310. The UPF sends the response message to the UE.

The UPF sends the response message to the UE, where the response message includes the IP address of the domain name of the application service that the UE requests to access. The UE obtains the IP address included in the response message, and then accesses the corresponding application service by using the IP address. Related steps and procedures belong to the conventional technology, and details are not described herein.

Figure 5:
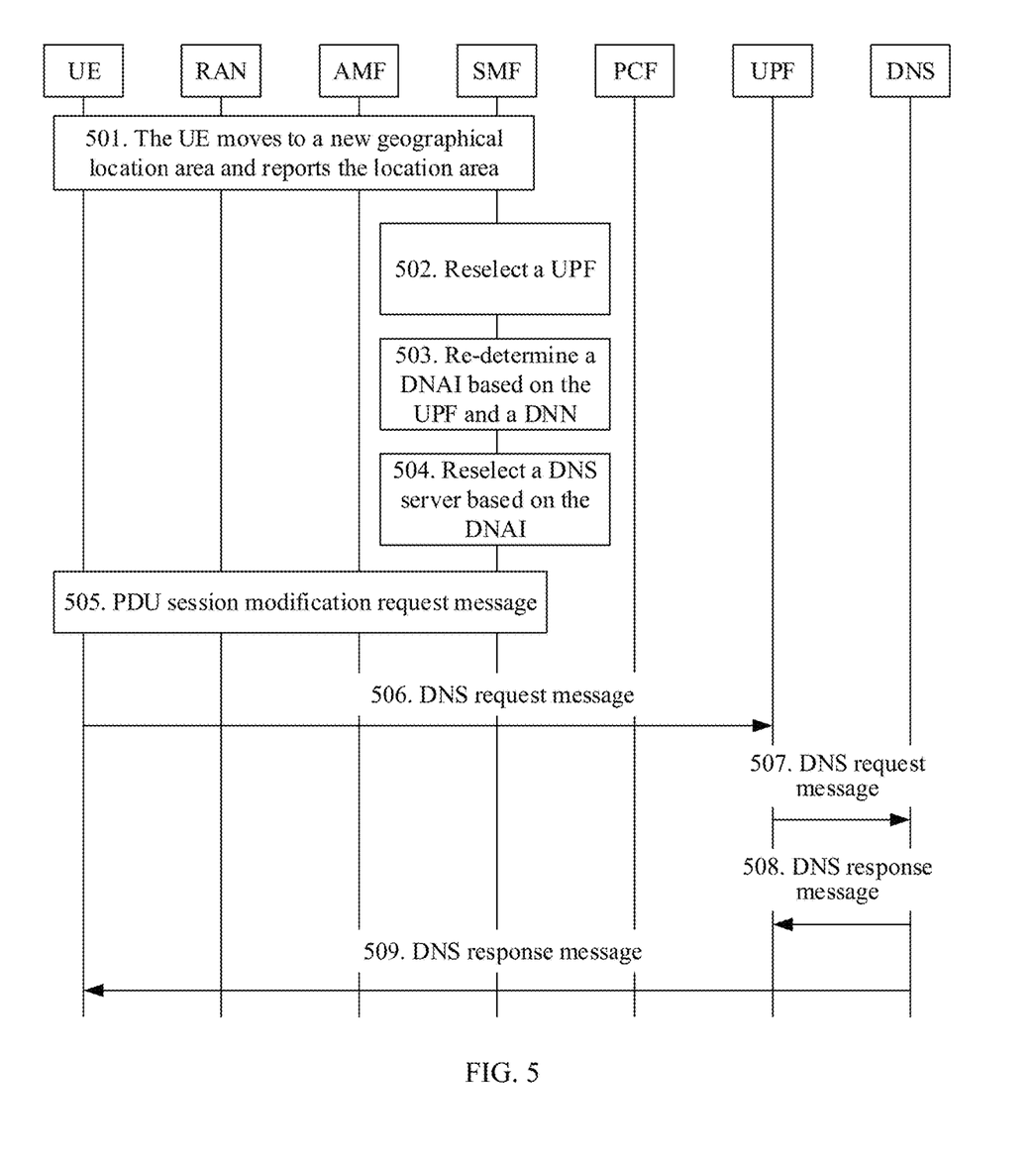
FIG. 5 is a flowchart of reallocating a DNS server by a core network to UE when the UE moves to another geographical location according to an embodiment of the present invention.

FIG. 5 is a flowchart of reallocating a DNS server by an SMF to UE when the UE moves to another geographical location in an MEC scenario according to another embodiment of the present invention. The method mainly includes the following steps.

501. The SMF detects that the UE moves to a new geographical location.

When the UE moves to the new geographical location, the UE reports a current location of the UE.

502. The SMF reselects a UPF.

In this embodiment, a data network to be accessed by the UE is the same as that in the foregoing embodiment, except that a network may cover different location areas, and a plurality of instances of an application service are deployed in the data network in the different location areas. After the UE moves, instances at different locations may separately provide a service with a same function for the UE. Providing a service by a service instance belongs to the conventional technology, and details are not described herein. In addition, different location areas also have different DNS servers, and the DNS servers separately provide domain name translation services for application services in the location areas. For details, refer to FIG. 6.

Figure 6:
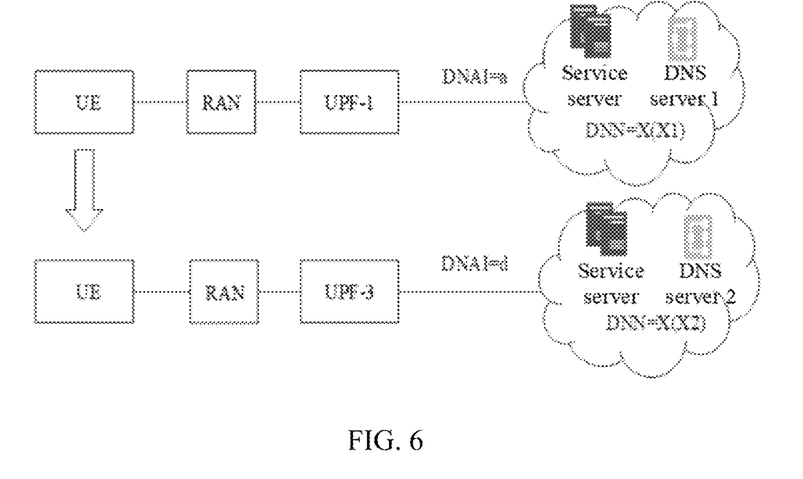
FIG. 6 is a schematic diagram of communication connections between different network areas of a same data network and different UPFs.

In FIG. 6, similar to step 303 in the foregoing embodiment, when the UE moves to another location area X2 of a data network X, the SMF selects, based on a data network X2 currently accessed by the UE, a UPF 3 that has a communication connection to the X2 (similarly, another UPF may be selected based on a load status of the another UPF having a communication connection).

503. The SMF re-determines a DNAI based on the selected UPF and a local data network to be accessed by the UE.

This step is similar to step 304, and is not described again.

504. The SMF queries a list of mapping relationship between addresses of DNS servers and locations based on an updated DNAI, to obtain an updated IP address of the DNS server.

505. The SMF initiates a PDU session modification request to the UE, where the PDU session modification request includes the updated IP address of the DNS server obtained in the foregoing step.

506 to 509 are similar to steps 307 to 310 in the foregoing embodiment, and a difference lies in that the destination address of the DNS request message sent by the UE is changed to the updated IP address of the DNS server.

According to the foregoing embodiments, the core network element SMF may allocate, based on a location of a local data network to be accessed by the UE, a corresponding DNS server located in the local data network to the UE, where the DNS server is capable of translating a domain name of an application service in the local data network that the UE needs to access. If the domain name requested by the UE is not within a service scope of the DNS server in the local data network, the DNS server in the local data network may serve as a DNS proxy to request an upper-level DNS server to resolve the domain name. When the UE moves to a new location and needs to access another instance (an instance replica) of the same application service, the SMF allocates a new DNS server to the UE. The new DNS server can resolve or translate a domain name of the instance. The solutions in the foregoing embodiments resolve a conventional-technology problem that the UE cannot obtain an IP address of a DNS server in a local data network, and consequently, the UE cannot resolve a domain name of an application service in the local data network by using a core network.

Figure 7:
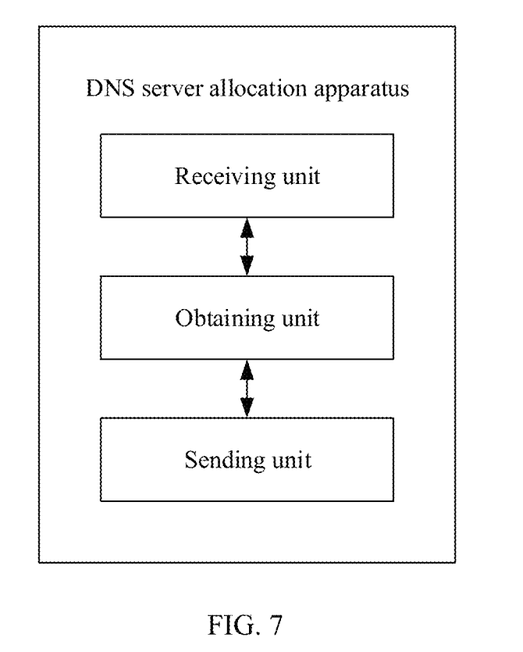
FIG. 7 is a schematic diagram of a DNS server allocation apparatus.

As shown in FIG. 7, an embodiment of the present invention further provides a DNS server allocation apparatus (an SMF), where the apparatus may be configured to perform related steps in the foregoing method embodiments. The apparatus includes:

a receiving unit, configured to receive a session establishment request message sent by a UE, where the request message includes a name of a data network to be accessed by the UE;

an obtaining unit, configured to obtain an IP address of a DNS server based on the name of the data network and a geographical location of the UE; and a sending unit, configured to send a session establishment response message to the UE, where the response message includes the IP address of the DNS server.

The obtaining unit is specifically configured to determine a user plane function UPF, determine a DNAI based on the UPF and the data network; and query a list of mapping relationships between IP addresses of DNS servers and DNAIs based on the DNAI, to obtain the IP address of the DNS server.

The foregoing functional units may further perform other related steps in the foregoing method embodiments, and details are not described herein again.

An embodiment of the present invention further provides a DNS server allocation system shown in FIG. 3 and FIG. 5, where the system may be configured to perform related steps in the foregoing method embodiments. The DNS server allocation system includes:

a session management function SMF, configured to receive a session establishment request message sent by a UE, where the request message includes a name of a data network to be accessed by the UE; obtain an IP address of a DNS server based on the name of the data network and a geographical location of the UE; and send a session establishment response message to the UE, where the response message includes the IP address of the DNS server; and a user plane function UPF, configured to receive a DNS request message sent by the UE, where the request message includes a domain name of an application service that the UE requests to access, and a destination address of the request message is an IP address of the DNS server; route the request message to the DNS server based on the destination address; receive a response message sent by the DNS server, where the response message includes an IP address of the domain name of the requested application service; and send the response message to the UE.

The foregoing system units SMF and UPF may further perform other related steps in the foregoing method embodiments, and details are not described herein again.

Figure 8:
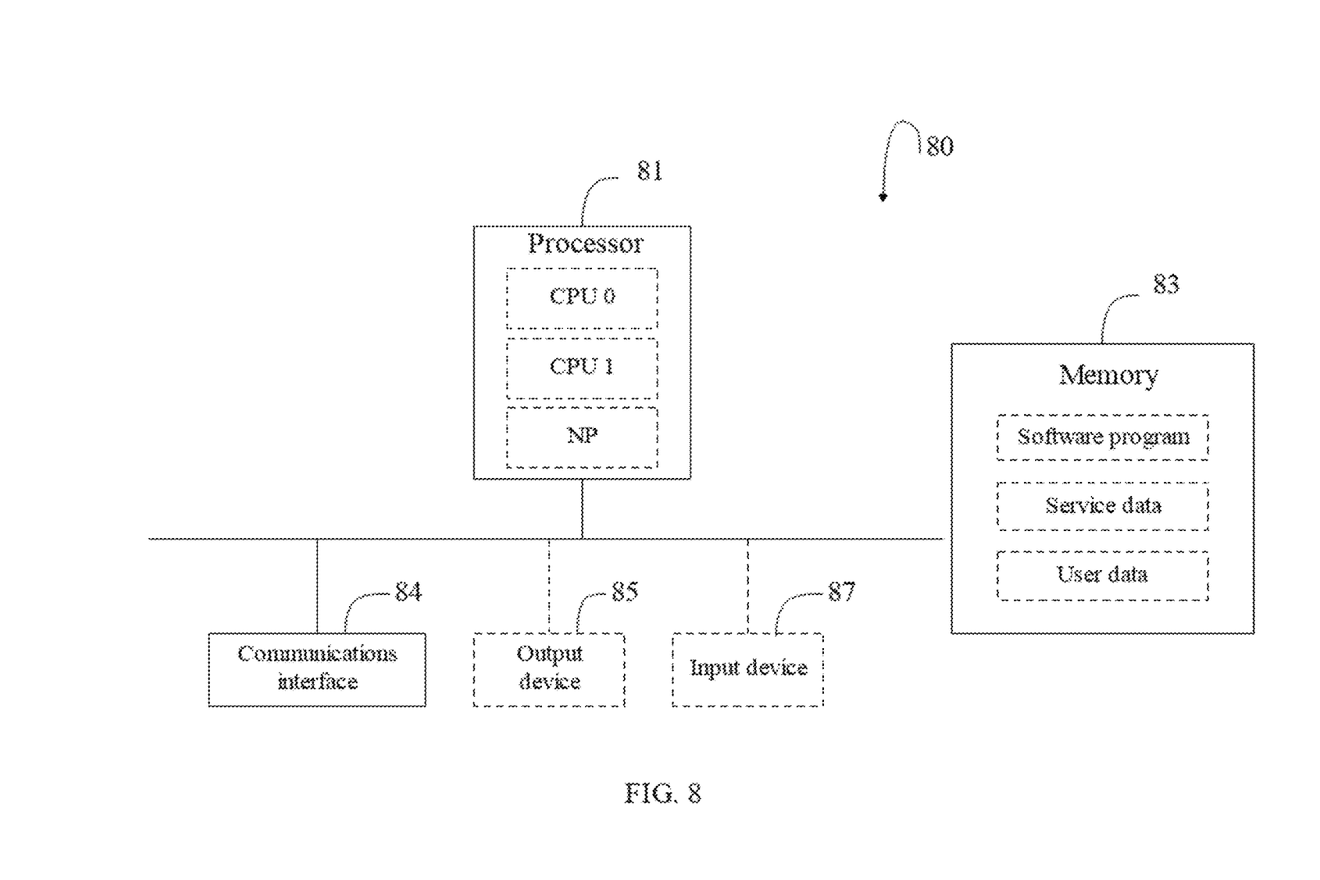
FIG. 8 is an entity hardware diagram of a DNS server allocation apparatus.

FIG. 8 is a hardware diagram of a DNS server allocation apparatus (an SMF) according to another embodiment of the present invention. The apparatus may include a processor 81, a communications interface 84, and a memory 83.

The processor 81 may include one or more processing units. The processing unit may be a central processing unit (English: central processing unit, CPU), a network processor (English: network processor, NP), or the like.

The communications interface 84 is configured to connect to and exchange information with another communications device, including receiving and sending a corresponding message. The network apparatus 80 may further include a memory 83, and the processor 81 may be connected to the memory 83 and the communications interface 84 through a bus. The memory 83 may be configured to store a software program. The software program may be executed by the processor 81, to implement the method steps in the embodiments shown in FIG. 3, FIG. 4, and FIG. 5. In addition, the memory 83 may further store various types of service data or user data, including status data of various application instances and services in the foregoing method steps, and the like.

Optionally, the network apparatus 80 may further include an output device 85 and an input device 87. The output device 85 and the input device 87 are connected to the processor 81. The output device 85 may be a display configured to display information, a power amplifier device configured to play a sound, a printer, or the like. The output device 85 may further include an output controller, configured to provide an output to the display, the power amplifier device, or the printer. The input device 87 may be a device such as a mouse, a keyboard, an electronic stylus, or a touch panel that is used by a user to input information. The input device 87 may further include an input controller, configured to receive and process an input from a device such as a mouse, a keyboard, an electronic stylus, or a touch panel.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD), a semiconductor medium (for example, a solid-state drive (Solid State-Disk, SSD)), or the like.

A person of ordinary skill in the art may understand that all or a part of the steps of the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing descriptions are merely embodiments of this application, but are not intended to limit this application. Any modification, equivalent replacement, improvement, or the like made within the scope of this application shall fall within the protection scope of this application.

The invention claimed is:

1. A method of domain name system (DNS) server allocation, comprising:
   receiving, by a session management function (SMF), a session establishment request message from user equipment (UE), wherein the request message comprises a name of a data network to be accessed by the UE;
   determining, by the SMF, a first user plane function (UPF) based on the data network to be accessed by the UE and a location of the UE, and determining a first data network access identifier (DNAI) based on the first UPF and the data network;
   querying, by the SMF, a list of mapping relationships between IP addresses of DNS servers and DNAIs based on the first DNAI, to obtain an IP address of a first DNS server; and
   sending, by the SMF, a session establishment response message to the UE, wherein the response message comprises the IP address of the first DNS server.

2. The method according to claim 1, wherein the step of querying comprises obtaining the list of mapping relationships between IP addresses of DNS servers and DNAIs from a policy control function (PCF).

3. The method according to claim 1, wherein the step of determining the first UPF comprises selecting the first UPF from a plurality of UPFs based on a relatively light load of the first UPF.

4. The method according to claim 1, further comprising:
   receiving, by the first UPF, a DNS request message from the UE, wherein the request message comprises a domain name of an application service that the UE requests to access, and a destination address of the request message is the IP address of the first DNS server;
   routing, by the first UPF, the request message to the first DNS server based on the destination address;
   receiving, by the first UPF, a response message from the first DNS server, wherein the response message comprises an IP address of the domain name of the requested application service; and
   sending, by the first UPF, the response message to the UE.

5. The method according to claim 1, further comprising:
   detecting, by the SMF, that the UE moves to a new geographical location;
   obtaining, by the SMF, an IP address of a second DNS server based on a name of a data network currently accessed by the UE and the new geographical location of the UE; and
   initiating, by the SMF, a PDU session modification request to the UE, wherein the modification request comprises the IP address of the second DNS server.

6. The method according to claim 5, wherein the step of obtaining the IP address of the second DNS server comprises:
   determining, by the SMF, a second UPF, and determining a second DNAI based on the second UPF and the data network currently accessed by the UE; and
   querying, by the SMF, the list of mapping relationships between IP addresses of DNS servers and DNAIs based on the second DNAI, to obtain the IP address of the second DNS server.

7. The method according to claim 6, further comprising:
   receiving, by the second UPF, a DNS request message from the UE, wherein the request message comprises a domain name of an application service that the UE requests to access, and a destination address of the request message is the IP address of the second DNS server;
   routing, by the second UPF, the request message to the second DNS server;
   receiving, by the second UPF, a response message from the second DNS server, wherein the response message comprises an IP address of the domain name of the requested application service; and
   sending, by the second UPF, the response message to the UE.

8. The method according to claim 6, wherein the step of determining the second UPF comprises:
   determining, by the SMF, the second UPF based on the data network to be accessed by the UE and the geographical location of the UE after the UE moves.

9. A domain name system (DNS) server allocation system, comprising:
   a session management function (SMF); and
   a user plane function (UPF),
   wherein the SMF comprises:
   a memory storing executable instructions; and a processor configured to execute the executable instructions in the memory of the SMF to perform operations of:
    receiving a session establishment request message from user equipment (UE), wherein the session establishment request message comprises a name of a data network to be accessed by the UE;
    determining a first user plane function (UPF) based on the data network to be accessed by the UE and a location of the UE, and determine a first data network access identifier (DNAI) based on the first UPF and the data network;
    querying a list of mapping relationships between IP addresses of DNS servers and DNAIs based on the first DNAI, to obtain an IP address of a first DNS server; and
    sending a session establishment response message to the UE, wherein the session establishment response message comprises the IP address of the DNS server;
wherein the UPF comprises:
    a memory storing executable instructions; and
    a processor configured to execute the executable instructions in the memory of the UPF to perform operations of:
        receiving a DNS request message from the UE, wherein the DNS request message comprises a domain name of an application service that the UE requests to access, and a destination address of the DNS request message is the IP address of the DNS server;
        routing the DNS request message to the DNS server based on the destination address;
        receiving a DNS response message from the DNS server, wherein the DNS response message received from the DNS server comprises an IP address of the domain name of the requested application service; and
        sending the DNS response message received from the DNS server to the UE.

10. The system according to claim 9, further comprising an application function, wherein the application function comprises:
    a memory storing executable instructions;
    a processor configured to execute the executable instructions in the memory of the application function to perform operations:
        creating the list of mapping relationships between IP addresses of DNS servers and DNAIs; and
        sending said list of mapping relationships to a policy control function (PCF), wherein the operation of the SMF querying comprises obtaining said list of mapping relationships from the PCF, and wherein the application function is an MEC platform, an MEC platform manager, or an MEC orchestrator in a multi-access edge computing MEC system.

11. An apparatus for domain name system (DNS) server allocation, comprising:
    a memory storing executable instructions;
    a processor configured to execute the executable instructions to:
        receive a session establishment request message from a UE, wherein the request message comprises a name of a data network to be accessed by the UE;
        determine a first user plane function (UPF) based on the data network to be accessed by the UE and a location of the UE, and determining a first data network access identifier (DNAI) based on the first UPF and the data network;
        query a list of mapping relationships between IP addresses of DNS servers and DNAIs based on the first DNAI, to obtain an IP address of a first DNS server; and send a session establishment response message to the UE, wherein the response message comprises the IP address of the DNS server.

12. The apparatus according to claim 11, wherein the processor is configured to receive the list of mapping relationships between IP addresses of DNS servers and DNAIs from a policy control function (PCF).

* * * * *